United States Patent
Yang et al.

(10) Patent No.: US 8,613,459 B2
(45) Date of Patent: Dec. 24, 2013

(54) VARIABLE GEAR RATIO TYPE RACK BAR AND STEERING APPARATUS FOR VEHICLE HAVING THE SAME

(75) Inventors: Kwang Ho Yang, Seoul (KR); Ki Che Park, Wonju-si (KR)

(73) Assignee: Mando Corporation, Pyeongtaek-si (KR)

( * ) Notice: Subject to any disclaimer, the term of this patent is extended or adjusted under 35 U.S.C. 154(b) by 176 days.

(21) Appl. No.: 13/030,844

(22) Filed: Feb. 18, 2011

(65) Prior Publication Data

US 2011/0204588 A1 Aug. 25, 2011

(30) Foreign Application Priority Data

Feb. 22, 2010 (KR) .................. 10-2010-0015754

(51) Int. Cl.
*B62D 3/12* (2006.01)
*F16H 19/04* (2006.01)

(52) U.S. Cl.
USPC ........... 280/93.514; 74/422; 74/33; 74/89.17; 74/109

(58) Field of Classification Search
USPC ............ 280/93.514, 93.515, 245, 254, 43.21; 180/427, 428; 74/422, 424.6, 29, 30, 74/31, 32, 33, 34, 35, 89.11, 89.12, 89.17, 74/89.18, 109, 10.39, 842, 120, 121
See application file for complete search history.

(56) References Cited

U.S. PATENT DOCUMENTS

| | | | | |
|---|---|---|---|---|
| 1,826,272 A * | 10/1931 | Chrisman | ........................ | 346/30 |
| 2,973,658 A * | 3/1961 | Bishop | .............. | 91/382 |
| 3,074,735 A * | 1/1963 | Ulrich | ...................... | 280/93.514 |
| 3,753,378 A * | 8/1973 | Bishop | ............. | 74/422 |
| 4,646,554 A * | 3/1987 | Wallis et al. | .................... | 72/406 |
| 5,687,811 A * | 11/1997 | Shimizu | ........................ | 180/447 |
| 6,470,993 B1 * | 10/2002 | Matsuda et al. | ............. | 180/444 |
| 8,196,487 B2 * | 6/2012 | Bless et al. | ...................... | 74/437 |

FOREIGN PATENT DOCUMENTS

| | | | |
|---|---|---|---|
| DE | 10347146 A1 * | 5/2005 | |
| JP | 56076757 A * | 6/1981 | |
| JP | 63053179 A * | 3/1988 | |
| JP | 63134376 A * | 6/1988 | |
| KR | 814760 B1 * | 3/2008 | |

* cited by examiner

*Primary Examiner* — Paul Dickson
*Assistant Examiner* — Keith Frisby
(74) *Attorney, Agent, or Firm* — McDermott Will & Emery LLP

(57) ABSTRACT

Disclosed are a variable gear ratio type rack bar, and a steering apparatus having the same. According to the present invention, it is not required to fabricate a separate mold for processing rack-formed parts with different inter-tooth spaces, the rack-formed parts can be formed by using various processing methods, and it is possible to obtain precise tooth shapes through one step processing, whereby the number of steps for manufacturing a variable gear ratio type rack bar and its manufacturing cost can be reduced.

10 Claims, 4 Drawing Sheets

VARIABLE GEAR RATIO TYPE RACK BAR AND STEERING APPARATUS FOR VEHICLE HAVING THE SAME

CROSS-REFERENCE TO RELATED APPLICATION

This application claims priority from and the benefit under 35 U.S.C. §19(a) of Korean Patent Application No. 10-2010-0015754, filed on Feb. 22, 2010, which is hereby incorporated by reference for all purposes as if fully set forth herein.

BACKGROUND OF THE INVENTION

1. Field of the Invention

The present invention relates to a variable gear ratio type rack bar and a steering apparatus having the same, and more particularly to a variable gear ratio type rack bar, and a steering apparatus for a vehicle including such a variable gear ratio type rack bar, the rack bar having two or more rack-formed parts with different inter-tooth spaces, wherein the rack-formed parts make it needless to fabricate a separate mold for processing them, the rack-formed parts can be formed by using various processing methods, and the rack-formed parts make it possible to obtain precise tooth shapes through one step processing.

2. Description of the Prior Art

FIG. 1 schematically shows the construction of a conventional rack-and-pinion type steering apparatus for a vehicle.

As shown in the drawing, the conventional rack-and-pinion type steering apparatus includes: a steering wheel 100 positioned at a driver seat side; a steering shaft 105 connected to the steering wheel; a steering column 103 adapted to allow the steering shaft to be fastened to a vehicle body; a gear box 130 including a rack 110 and a pinion 120 for converting torsional force input from the steering shaft 105 to rectilinear movement; a rack bar 140 including a rack bar body 115 on which the rack 110 is formed; and a pair of tie rods 150 integrally formed with balls of inner ball joints 135, respectively, the inner ball joints being provided at the opposite ends of the rack bar 140, respectively, and the tie rods 150 being connected with outer ball joints 155, respectively, so that power is transmitted to knuckles 159 so as to steer tires 158.

In general, a steering apparatus for a vehicle is an apparatus for allowing a driver to change the running direction of a vehicle in accordance with the driver's intention while the vehicle is being run, wherein as shown in FIG. 1, the steering apparatus includes: a steering wheel capable of being rotated by the driver; a steering shaft having an end coupled to the steering wheel to be rotated together with the steering wheel; a pinion provided at the lower end of the steering shaft and positioned within a gear box, the pinion being rotated together with the steering shaft; and a rack bar, on which a rack is formed to be engaged with the pinion, the rack bar conducting rectilinear movement in accordance with the rotation of the pinion.

With the steering apparatus configured as described above, as the steering angle of the steering wheel is increased, torque applied to the pinion is increased due to the tires' friction and the geometry of the vehicle, wherein in order to reduce the torque applied to the pinion, a hydraulic power steering system increases hydraulic pressure, and an electric power steering system increases the power of a motor.

In general, the angle for manipulating the steering wheel for a vehicle is typically limited within 90° while the vehicle is running on a road, and the steering wheel may be manipulated over 90° only when parking or U-turning the vehicle.

However, since the gear ratio of the rack and pinion of such a steering apparatus is determined to be constant, inconvenience to necessarily manipulate the steering wheel to a large extent is accompanied at the time of parking or U-turning.

In addition, since in increasing hydraulic pressure or motor power for reducing torque applied to a pinion, there was a limitation as well as a problem of inefficiency, variable gear ratio (VGR) systems have been developed in order to solve these problems.

Here, a VGR system means a system in which the gear ratio of a pinion, to which steering wheel manipulating force is input, and a rack cooperating with the pinion is variable in such a manner that the input angle at the opposite side parts of the rack differs from that at the central part of the rack, so that when the manipulating extent of the steering wheel is large, the moving distance of the rack is increased, thereby reducing the required manipulating extent of the steering wheel at the time of parking or U-turning, which helps a driver to conveniently drive the vehicle.

The above-mentioned VGR system is a system having a rack, the shape of which is modified in the following manner: inter-tooth spaces of the teeth of the rack are increased as approaching to the opposite ends from the central part of the rack, so that as the steering angle of the steering wheel is increased, the moving distance of the rack is also increased, thereby reducing the torque applied to the pinion.

Such a conventional VGR steering system has problems in that when forming rack-formed parts on a rack bar body using a bobbing machine or a broaching machine, it is impossible to process the rack-formed parts with different inter-teeth spaces at once, and even if the rack-formed parts are processed through plural separated steps, the processing error of the rack-formed parts become severe, which in turn causes the precision of the rack to be deteriorated.

In addition, if a forging process is employed so as to process such rack-formed parts at once, there are problems in that the precision is deteriorated in terms of the shape and size of the rack, which in turn causes a driver's steering feeling to be deteriorated when the driver manipulates the steering wheel.

Furthermore, if a precise forging process is employed for securing the precision in terms of the shape and size of the rack, there are problems in that the length of production time is substantially increased, and the manufacturing cost is very high.

SUMMARY OF THE INVENTION

Accordingly, the present invention has been made to solve the above-mentioned problems occurring in the prior art, and an object of the present invention is to provide a variable gear ratio type rack bar having two or more rack-formed parts with different inter-tooth spaces, wherein the rack-formed parts make it needless to fabricate a separate mold for processing forming-parts having inter-tooth spaces, the rack-formed parts can be formed by using various processing methods, and the rack-formed parts make it possible to obtain precise tooth shapes through one step processing, whereby it is possible to reduce the number of steps for manufacturing a various gear ratio type rack bar and the manufacturing cost of such a various gear ratio type rack bar.

In order to accomplish this object, there is provided a variable gear ratio type rack bar including: two or more rack-formed parts on a side of a rack bar body, the rack-formed parts having different inter-tooth spaces, wherein the rack-formed parts are continuously arranged, and at least one of the rack-formed parts is formed separately from the rack bar body to have a predetermined thickness from a rack-formed side's end, and then coupled to the rack bar body.

In accordance with another aspect of the present invention, there is provided a variable gear ratio type rack bar including: three rack-formed parts on a side of a rack bar body, the rack-formed parts having different inter-tooth spaces, wherein the rack-formed parts are continuously arranged, the rack-formed parts consist of a variable rack-formed part arranged at the central area, and basic rack-formed parts arranged at the opposite sides of the variable-rack-formed part, and the variable-rack-formed part is formed separately from the rack bar body to have a predetermined thickness from a rack-formed side's end, and then coupled to the rack bar body.

In accordance with another aspect of the present invention, there is provided a steering apparatus for a vehicle including a steering wheel, a steering shaft connected to the steering wheel, and a variable gear ratio type rack bar for converting rotational force into rectilinear movement, the rotational force being input to the rack bar from the steering shaft while changing the extent of manipulating the steering wheel, wherein the variable gear ratio type rack bar includes: two or more rack-formed parts on a side of a rack bar body, the rack-formed parts having different inter-tooth spaces, wherein the rack-formed parts are continuously arranged, and at least one of the rack-formed parts is formed separately from the rack bar body to have a predetermined thickness from a rack-formed side's end, and then coupled to the rack bar body.

According to the present invention as described above, it is not required to fabricate a separate mold for processing rack-formed parts with different inter-tooth spaces, the rack-formed parts can be formed by using various processing methods, and it is possible to obtain precise tooth shapes through one step processing, whereby the number of steps for manufacturing a variable gear ratio type rack bar and its manufacturing cost can be reduced.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
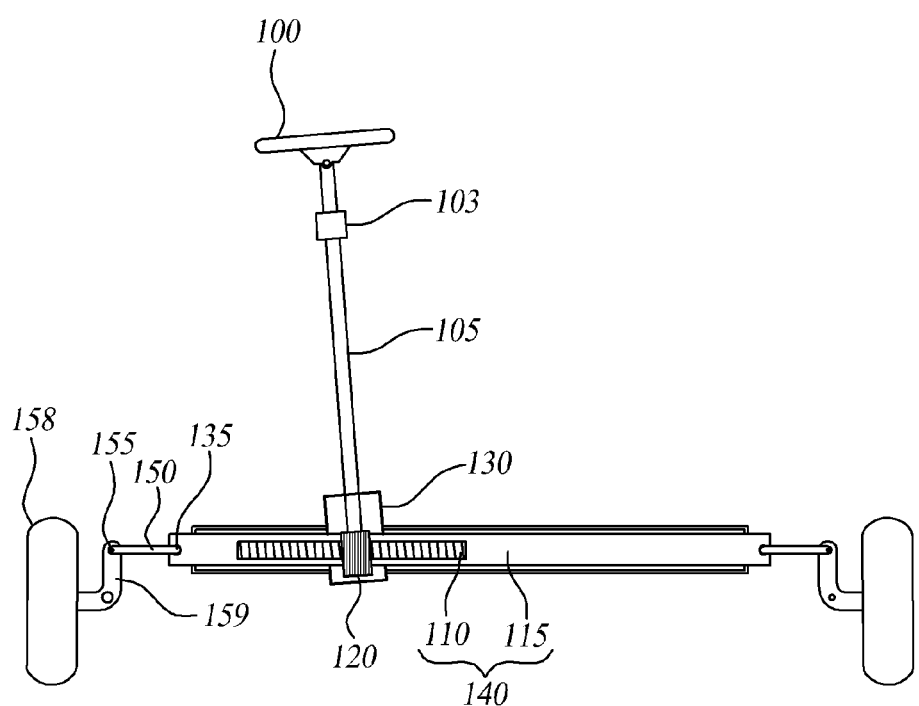
FIG. 1 schematically shows the construction of a conventional rack-and-pinion type steering apparatus for a vehicle.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
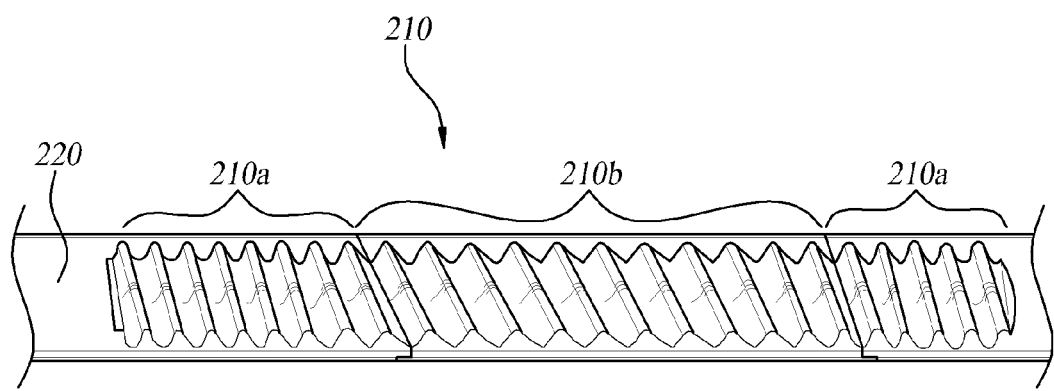
FIG. 2 is a partially cut-out side view showing a variable gear ratio type rack bar in accordance with an embodiment of the present invention.
Figure 3:
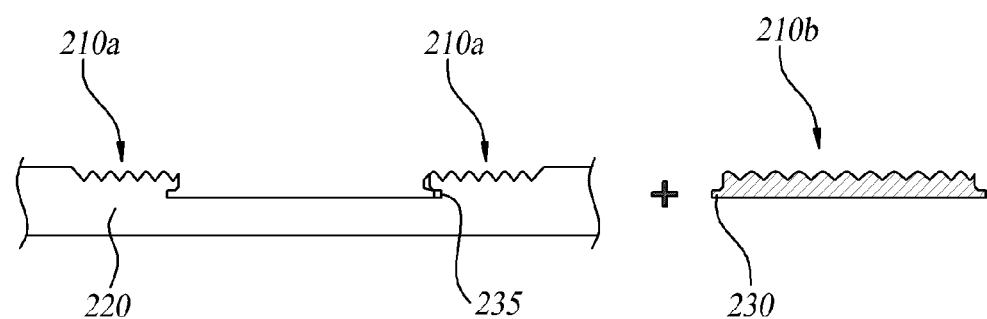
FIG. 3 is a cross-sectional view showing the variable gear ratio type rack bar shown in FIG. 2 in the disassembled state.
Figure 4:
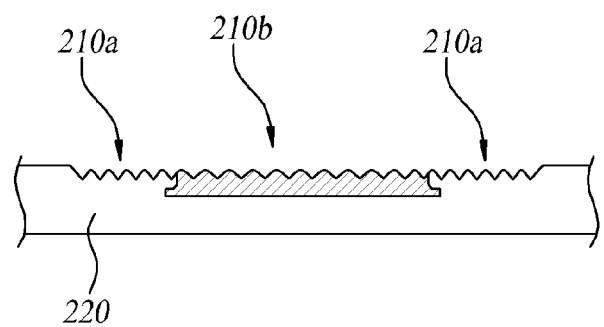
FIG. 4 is a cross-sectional view showing the variable gear ratio type rack bar shown in FIG. 2 in the assembled state.

FIG. 2 is a partially cut-out side view showing a variable gear ratio type rack bar in accordance with an embodiment of the present invention, FIG. 3 is a cross-sectional view showing the variable gear ratio type rack bar shown in FIG. 2 in the disassembled state, and FIG. 4 is a cross-sectional view showing the variable gear ratio type rack bar shown in FIG. 2 in the assembled state.

As shown in these drawings, a variable gear ratio (VGR) type rack bar 210 in accordance with an embodiment of the present invention includes: two or more rack-formed parts 210a and 210b on a side of a rack bar body 220, the rack-formed parts having different inter-tooth spaces 210a and 210b, wherein the rack-formed parts 210a and 210b are continuously arranged, and at least one of the rack-formed parts 210a and 210b is formed separately from the rack bar body 220 to have a predetermined length from its rack-formed side, and then coupled to the rack bar body 220.

The VGR type rack bar 210 is provided with rack-formed parts adapted to allow the gear ratio to be variable in relation to a pinion so as to alleviate or remove a driver's inconvenience to necessarily manipulate the steering wheel to a large extent when parking or U-turning a vehicle, or so as to reduce the driver's manipulating force of the steering wheel by reducing torque applied to the pinion (see the part indicated by reference numeral 120 in FIG. 1) connected with a steering shaft (see the part indicated by reference numeral 105 in FIG. 1) at the time of manipulating the steering wheel (see the part indicated by reference numeral 100).

Therefore, the inventive VGR type rack bar 210 has two or more rack-formed parts 210a and 210b, wherein at least one of the rack-formed parts is formed separately from the rack bar body 220, and then coupled to the rack bar body 220.

That is, when forming a rack on the rack bar body 220, at least one variable-rack-formed part 210b or at least one basic-rack-formed part 210a is separately formed to have a predetermined thickness, a mounting face is formed on an area for providing the rack-formed parts through a cutting process, the separately formed rack-formed part being adapted to be mounted on the mounting face, and then the separately formed rack-formed part (for example the variable-rack-formed part 210b) is coupled to the rack bar body 220.

In accordance with an embodiment of the present invention, there may be provided three rack-formed parts 210a, 210b and 210a, which consist of one variable-rack-formed part 210b arranged at the central area, and two basic-rack-formed parts 210a arranged at the opposite sides of the variable-rack-formed part 210a, respectively, wherein the rack-formed parts 210a and 210b are formed in such a manner that the inter-tooth space of the variable-rack-formed part 210b is different from that of the basic-rack-formed parts 210a.

In addition, although at least one of the rack-formed parts may be formed separately from the rack bar body, and then coupled to the rack bar body, in the following description of the embodiments of the present invention, it is assumed that among the rack-formed parts 210a and 210b, only the variable-rack-formed part 210b is separately formed from the rack bar body 220, and coupled to the rack bar body 220 for the convenience of description.

Each of the variable-rack-formed part 210b and the basic-rack-formed parts 210a has rack gear teeth on a side, wherein the rack gear teeth are formed to have different inter-tooth spaces by using a broaching machine or a bobbing machine or through a forging process, and then the variable-rack-formed part 210b or the basic-rack-formed parts 210a is coupled to the rack bar body.

In order to couple the separately formed variable-rack-formed part 210b to the rack bar body, press-fitting or welding may be preferably employed, and various bonding techniques such as adhesive bonding and melting bonding may be also employed, wherein when welding is employed, welding is performed along the interface between the variable-rack-formed part 210b and the rack bar body 220.

In the case of press-fitting, it is possible to make the rack-formed part 210b be coupled to the rack bar body with proper pressure by determining the sizes of the rack-formed parts 210a and 210b and the mounting face on the rack bar body 220 with a relatively precise tolerance.

In addition, in the case of press-fitting, the separately formed variable-rack-formed part 210b and the rack bar body 220 are provided with interlocking means which are engaged with each other: for example, the interlocking means may consist of protrusions 230 formed on one side of the variable-rack-formed part 210b and the rack bar body, and grooves 235 formed on the other side of the variable-rack-formed part 210b and the rack bar body to correspond to the protrusions in shape, so that the protrusions are engaged with the grooves, respectively.

That is, as shown in FIG. 3, the separately formed variable-rack-formed part 210b and the opposite sides of the mounting face of the rack bar body 220 are provided with protrusions 230 and grooves 235, respectively, and then the variable-rack-formed part 210b may be coupled to the rack bar body 220 by sliding the variable-rack-formed part 210b on the mounting face, so that the protrusions 230 and the grooves 235 are engaged with each other.

If at least one of the rack-formed parts 210a and 210b is formed separately from the rack bar body 220 and coupled to the rack bar body 220, it is possible to process the rack gear teeth on each of the rack-formed parts 210a and 210b in such a manner that the rack gear teeth can be formed at once, and in particular, it is possible to obtain a tooth shape which is simple and precise as compared to those obtained through a forging process.

Here, the inter-tooth space of the variable-rack-formed part 210b may be larger than that of the basic-rack-formed parts 210a, in which case when the steering wheel is rotated to the end, i.e. when the steering wheel is rotated leftward and rightward to the end, the extent of rotating the steering wheel is reduced, which will cause the steering operation to be simple and convenient.

Like this, it is possible to form the inter-tooth space of one side of the variable-rack-formed part 210b and the basic-rack-formed parts 210a to be larger than that of the other side depending on the purpose of fabricating a corresponding steering apparatus.

Among the variable-rack-formed part 210b and the basic-rack-formed parts 210a, one or two of them, or all of them can be separately formed and then coupled to a rack bar.

Unlike the above description, it is also possible to form the variable-rack-formed part 210b and the basic-rack-formed parts 210a in such a manner that each of them has gradually changed inter-tooth spaces.

That is, it is possible to form the variable-rack-formed part 210b to have inter-tooth spaces which are gradually reduced as approaching to its opposite ends from its central part, and to the contrary, it is also possible to form the variable-rack-formed part 210b to have inter-tooth spaces which are gradually increased as approaching to its opposite ends from its central part.

If the inter-tooth spaces of the variable-rack-formed part 210b are gradually reduced as approaching to its opposite ends from its central part, it is also possible to form each of the basic-rack-formed parts 210a in such a manner that each of them has inter-tooth spaces which are gradually reduced as approaching to its end positioned away from the variable-rack-formed part 210b to its end abutted against the variable-rack-formed part 210b with the same inter-tooth space reducing rate with the variable-rack-formed part 210b.

To the contrary, if the inter-tooth spaces of the variable-rack-formed part 210b are gradually reduced as approaching to its opposite ends from its central part, it is also possible to form each of the basic-rack-formed parts 210a in such a manner that each of them has inter-tooth spaces which are gradually reduced as approaching from its end abutted against the variable-rack-formed part 210b to its opposite end to the same inter-space reducing rate with the variable-rack-formed part 210b.

If the inter-tooth spaces are reduced or increased as approaching to the opposite sides from the central part from the variable-rack-formed part 210b as described above, the rotating extent of the steering wheel will be increased or reduced when turning the vehicle which is run straightly, and at the same time, the force for manipulating the steering wheel will be reduced or increased.

According to another aspect of the present invention there is provided a steering apparatus including a VGS type rack bar 210, which will be described below, also with reference to FIG. 1.

The inventive steering apparatus for a vehicle has a steering wheel 100, a steering shaft 105 connected to the steering wheel 100, and a variable gear ratio type rack bar for converting rotational force into rectilinear movement, the rotational force being input to the rack bar from the steering shaft while changing the extent of manipulating the steering wheel, the variable gear ratio type rack bar including: two or more rack-formed parts 210a and 210b on a side of a rack bar body 220, the rack-formed parts having different inter-tooth spaces, wherein the rack-formed parts are continuously arranged, and at least one of the rack-formed parts 210a and 210b is formed separately from the rack bar body to have a predetermined thickness from a rack-formed side's end, and then coupled to the rack bar body 220.

Since the VGR type rack bar 210 is the same with the VGR type rack bar described above in connection with the embodiments of the present invention, its detailed description will be omitted.

According to the present invention as described above, it is not required to fabricate a separate mold for processing rack-formed parts with different inter-tooth spaces, the rack-formed parts can be formed by using various processing methods, and it is possible to obtain precise tooth shapes through one step processing, whereby the number of steps for manufacturing a variable gear ratio type rack bar and its manufacturing cost can be reduced.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A variable gear ratio type rack bar comprising:
two or more rack-formed parts on a side of a rack bar body, the rack-formed parts having different inter-tooth spaces, wherein the rack-formed parts are continuously arranged so as to overlap each other in a longitudinal direction of the rack bar body, and at least one of the rack-formed parts is formed separately from the rack bar body to have a predetermined thickness from a rack-formed side's end, and then coupled to the rack bar body, wherein the separately formed rack-formed part and the rack bar body have interlocking means which are engaged with each other, and
wherein the interlocking means comprises:
one or more protrusions formed on the separately formed rack-formed part, and one or more grooves formed on the rack bar body to be engaged with the protrusions, respectively.

2. The rack bar as claimed in claim 1, wherein there are provided three rack-formed parts, which consist of a variable-rack-formed part arranged at the central area, and basic-rack forming-parts arranged at the opposite sides of the variable rack-formed part, respectively, the inter-tooth space of the variable-rack-formed part is different from that of the basic-rack-formed parts.

3. The rack bar as claimed in claim 2, wherein the inter-tooth space of the variable-rack-formed part is larger than that of the basic-rack-formed parts.

4. The rack bar as claimed in claim 2, wherein the inter-tooth space of the basic-rack-formed parts is larger than that of the variable-rack-formed part.

5. The rack bar as claimed in claim 2, wherein the variable-rack-formed part is formed to have inter-tooth spaces which are reduced as approaching to its opposite ends of the variable-rack-formed part from its central part.

6. The rack bar as claimed in claim 5, wherein each of the basic-rack-formed parts is formed to have inter-tooth spaces which are reduced as approaching to its end positioned away from the variable-rack-formed part from its end abutted against the variable-rack-formed part in the same reducing rate with those of the variable-rack-formed part.

7. The rack bar as claimed in claim 2, wherein the variable-rack-formed part is formed to have inter-tooth spaces which are increased as approaching to its opposite ends of the variable-rack-formed part from its central part.

8. The rack bar as claimed in claim 7, wherein each of the basic-rack-formed parts is formed to have inter-tooth spaces which are increased as approaching to its end positioned away from the variable-rack-formed part from its end abutted against the variable-rack-formed part in the same increasing rate with those of the variable-rack-formed part.

9. A variable gear ratio type rack bar comprising:
three rack-formed parts on a side of a rack bar body, the rack-formed parts having different inter-tooth spaces, wherein the rack-formed parts are continuously arranged so as to overlap each other in a longitudinal direction of the rack bar body, the rack-formed parts consist of a variable rack-formed part arranged at the central area, and basic rack-formed parts arranged at the opposite sides of the variable-rack-formed part, and the variable-rack-formed part is formed separately from the rack bar body to have a predetermined thickness from a rack-formed side's end, and then coupled to the rack bar body, wherein the separately formed variable-rack-formed part and the rack bar body have interlocking means which are engaged with each other, and
wherein the interlocking means comprises:
one or more protrusions formed on the separately formed variable-rack-formed part, and one or more grooves formed on the rack bar body to be engaged with the protrusions, respectively.

10. A steering apparatus for a vehicle having a steering wheel, a steering shaft connected to the steering wheel, and a variable gear ratio type rack bar for converting rotational force into rectilinear movement, the rotational force being input to the rack bar from the steering shaft while changing the extent of manipulating the steering wheel, the variable gear ratio type rack bar comprising:
two or more rack-formed parts on a side of a rack bar body, the rack-formed parts having different inter-tooth spaces, wherein the rack-formed parts are continuously arranged so as to overlap each other in a longitudinal direction of the rack bar body, and at least one of the rack-formed parts is formed separately from the rack bar body to have a predetermined thickness from a rack-formed side's end, and then coupled to the rack bar body, wherein the separately formed rack-formed part and the rack bar body have interlocking means which are engaged with each other, and
wherein the interlocking means comprises:
one or more protrusions formed on the separately formed rack-formed part, and one or more grooves formed on the rack bar body to be engaged with the protrusions, respectively.

* * * * *